(12) United States Patent
Maximo et al.

(10) Patent No.: US 10,803,585 B2
(45) Date of Patent: Oct. 13, 2020

(54) SYSTEM AND METHOD FOR ASSESSING IMAGE QUALITY

(71) Applicant: General Electric Company, Schenectady, NY (US)

(72) Inventors: Andre de Almeida Maximo, Rio de Janeiro (BR); Chitresh Bhushan, Schenectady, NY (US); Thomas Kwok-Fah Foo, Clifton Park, NY (US); Desmond Teck Beng Yeo, Clifton Park, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 155 days.

(21) Appl. No.: 16/155,680

(22) Filed: Oct. 9, 2018

(65) Prior Publication Data

US 2020/0111210 A1   Apr. 9, 2020

(51) Int. Cl.
*G06K 9/00* (2006.01)
*G06T 7/00* (2017.01)
*G06K 9/62* (2006.01)
*G06N 3/08* (2006.01)
*G06T 3/40* (2006.01)

(52) U.S. Cl.
CPC ............ *G06T 7/0014* (2013.01); *G06K 9/627* (2013.01); *G06N 3/084* (2013.01); *G06T 3/4046* (2013.01); *G06T 2207/10088* (2013.01); *G06T 2207/20081* (2013.01); *G06T 2207/30096* (2013.01)

(58) Field of Classification Search
CPC .................................................. G06T 7/0014
USPC ......................................................... 382/159
See application file for complete search history.

(56) References Cited

U.S. PATENT DOCUMENTS

| | | | |
|---|---|---|---|
| 9,687,199 B2 | 6/2017 | Ithapu et al. | |
| 9,836,840 B2 | 12/2017 | Fonte et al. | |
| 9,922,272 B2 | 3/2018 | Cheng et al. | |
| 2017/0109881 A1 | 4/2017 | Avendi et al. | |
| 2017/0154423 A1* | 6/2017 | Heo | G06K 9/00604 |
| 2017/0177979 A1 | 6/2017 | Chokshi et al. | |
| 2017/0372155 A1 | 12/2017 | Odry et al. | |
| 2017/0372193 A1 | 12/2017 | Mailhe et al. | |
| 2018/0144214 A1 | 5/2018 | Hsieh et al. | |
| 2018/0144466 A1 | 5/2018 | Hsieh et al. | |
| 2019/0114773 A1* | 4/2019 | Song | G06T 7/11 |
| 2019/0122075 A1* | 4/2019 | Zhang | G06N 3/0454 |

FOREIGN PATENT DOCUMENTS

EP           3252671 A1     12/2017

OTHER PUBLICATIONS

Japkowicz, Nathalie, et al.; "A Novelty detection Approach to Classification", Research gate, pp. 518-523, 1995.

(Continued)

*Primary Examiner* — Stephen P Coleman
(74) *Attorney, Agent, or Firm* — Fletcher Yoder, P.C.

(57) ABSTRACT

The present disclosure relates to the classification of images, such as medical images using machine learning techniques. In certain aspects, the technique may employ a distance metric for the purpose of classification, where the distance metric determined for a given image with respect to a homogenous group or class of images is used to classify the image.

22 Claims, 9 Drawing Sheets

(56) References Cited

OTHER PUBLICATIONS

Shin, Hoo-Chang, et al.; "Stacked Autoencoders for Unsupervised Feature Learning and Multiple Organ Detection in a Pilot Study Using 4D Patient Data", IEEE Transactions on Pattern Analysis and Machine Intelligence, vol. 35, Issue: 8, pp. 1930-1943, Aug. 2013.

Carreira-Perpinan, Miguel A., et al.; "Hashing with binary autoencoders", Machine Learning, pp. 557-566, Jan. 5, 2015.

Kumar, Devinder, et al.; "Lung Nodule Classification Using Deep Features in CT Images", Research gate, pp. 1-7, Jul. 2015.

Kustner, Thomas, et al.; "An easy-to-use image labeling platform for automatic magnetic resonance image quality assessment", 2017 IEEE 14th International Symposium on Biomedical Imaging (ISBI 2017), pp. 754-757, Melbourne, 2017.

Baur, Christopher, et al.; "Deep Autoencoding Models for Unsupervised Anomaly Segmentation in Brain MR Images" Computer Vision and Pattern Recognition, pp. 1-9, Apr. 12, 2018.

Kustner, T., et al.; "A machine-learning framework for automatic reference-free quality assessment in MRI", Magnetic Resonance Imaging, vol. 53, pp. 134-147, Nov. 2018.

\* cited by examiner

SYSTEM AND METHOD FOR ASSESSING IMAGE QUALITY

TECHNICAL FIELD

The subject matter disclosed herein relates to classification of images, such as medical images, using machine learning approaches, including approaches that incorporate deep learning and/or stacked autoencoders.

BACKGROUND

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

With this in mind, such non-invasively acquired medical images have become the de facto standard in current medical practice, providing guidance with respect to diagnostics by allowing internal visualization of the interior of the human body. However, the complexity of the technology that leverages the various physical principles noted above, as well as the biological diversity of the human body, make the overall image acquisition process subject to various errors, which may reduce the quality of the final acquired image.

Although these technologies have evolved in the last decades, the workflow to perform both image acquisition and image quality assessment is still very manual. As a result, errors related to image acquisition are common and retakes, to correct for the errors, occur regularly. To complicate matters even further, there are many types of errors in different parts of the workflow process that may occur while acquiring medical images, making it difficult to understand, find and classify the errors when they occur.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

With the preceding in mind, the present technique can be used in different scenarios that involve classification of images. General classification approaches require knowledge of each class in the dataset and need a good balance of number of samples in each class. In contrast, the presently disclosed techniques overcome these limitations in general classification by: (1) avoiding a need of explicit knowledge of the class labels; (2) being suitable for use with a large class imbalance, which is common in medical image analysis; (3) providing an automated approach to decide if a new sample-image is similar to the training dataset; and (4) providing a distance metric from the training dataset for a new sample image, which can be used for multi-class classification approaches.

In this manner, the presently disclosed techniques have certain practical applications, such as ensuring that that the quality of the acquired images is good for clinical diagnosis with medical images. In addition, a further practical application is multi-class classification of tumors from medical images.

In a first embodiment, a method of training and using a machine learning image classification algorithm is provided. In accordance with this method, an autoencoder model is trained using a training data set. The training data set includes training images classified as being of a first class. An encoder model is derived from the autoencoder model after the autoencoder model is trained. The encoder model is used to classify input images, wherein each respective input image is classified as being either of the first class or one or more other classes. A classification for one or more of the input images is output.

In a further embodiment, a method for classifying images is provided. In accordance with this embodiment, training images of a training data set are encoded using an encoder model. The encoder model comprises a subset of a trained autoencoder model. A cluster statistic for the training data set is determined based on the encoded training images. True-pixels counts (TPC) for the training images of the training data set are determined using the cluster statistic. One or more TPC thresholds are determined based on the determined TPC for the training images of the training data set. A TPC of a respective input image is compared to the one or more TPC thresholds. Based on the comparison go the TPC of the respective input image to the one or more TPC thresholds, the respective input image is classified. Each respective input image is classified as being either of a first class used to train the autoencoder model or one or more other classes. A classification of the respective input image is output.

In an additional embodiment, an image classification system is provided. In accordance with this embodiment, the image classification system comprises processing circuitry configured to execute one or more stored routines, wherein the routines, when executed, cause the processing circuitry to: encode training images of a training data set using an encoder model, wherein the encoder model comprises a subset of a trained autoencoder model; determine a cluster statistic for the training data set based on the encoded training images; determine true-pixels counts (TPC) for the training images of the training data set using the cluster statistic; determine one or more TPC thresholds based on the determined TPC for the training images of the training data set; compare a TPC of a respective input image to the one or more TPC thresholds; based on the comparison go the TPC of the respective input image to the one or more TPC thresholds, classify the respective input image, wherein each respective input image is classified as being either of a first class used to train the autoencoder model or one or more other classes; and output a classification of the respective input image

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
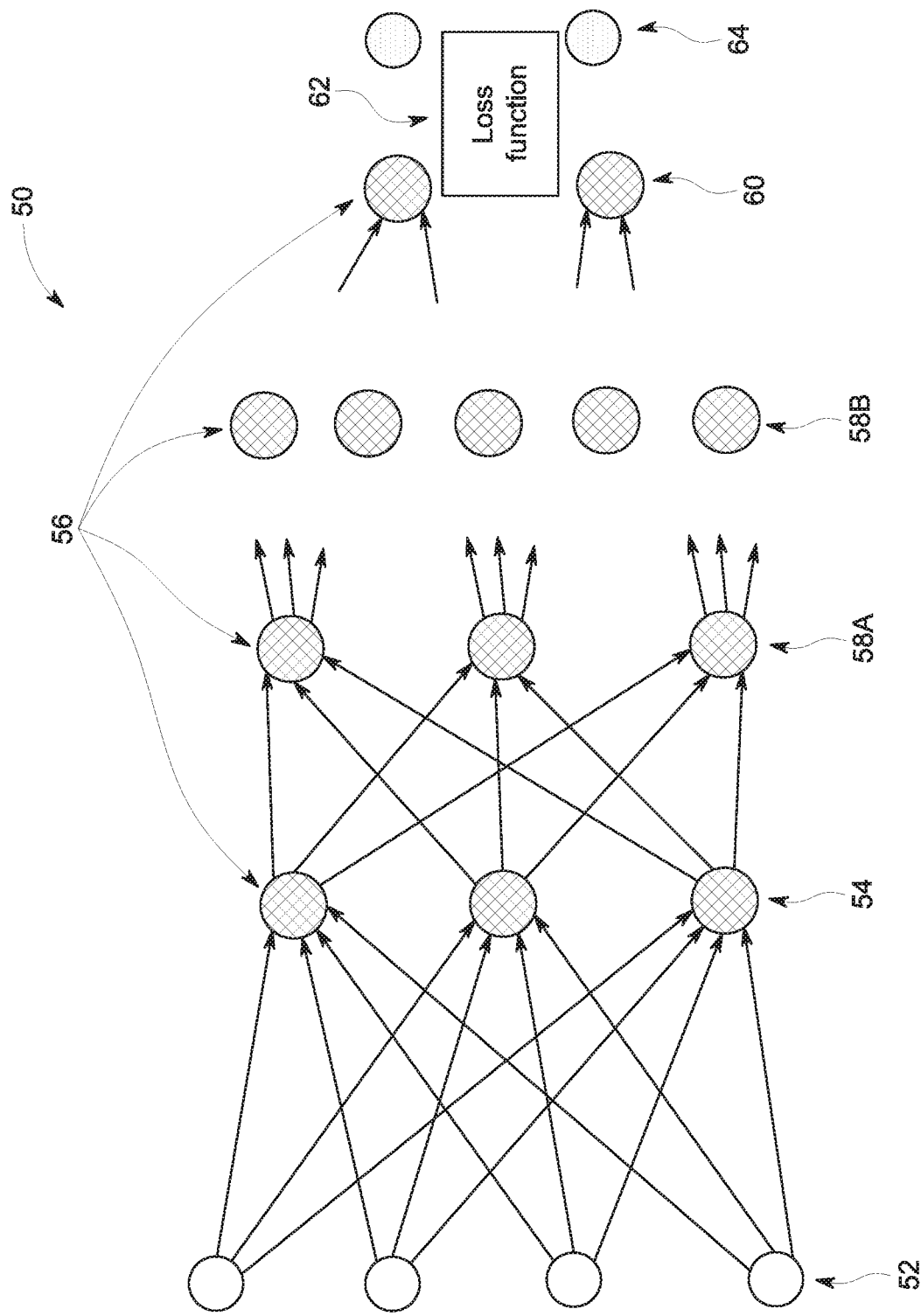
FIG. 1 depicts an example of an artificial neural network for training a deep learning model, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Further, though magnetic resonance imaging (MR or MRI) and generalized X-ray based imaging examples are primarily provided herein, it should be understood that the disclosed techniques may be used in other imaging modality contexts. For instance, the presently described approach may also be employed on data acquired by other types of scanners, or special purpose scanners of the types described, including, but not limited to, computed tomography (CT), mammography, tomosynthesis, positron emission tomography (PET), and single photon emission computed tomography (SPECT) scanners as well as others.

With this in mind, and as discussed herein, the present disclosure relates to the use of machine learning, such as deep learning and stacked autoencoders, to classify images. For example, present embodiments relate to performing binary or multi-class classification on images automatically, separating images into different class groups using a distance metric that quantifies the degree of separation or extent of deviation from only one reference homogeneous group. In certain such implementations, an input image may be classified using a machine learning model which may be used for decision making, such as to accept or reject an input image in a given application. The technique may employ a single homogeneous group of images for training a deep-learning based autoencoder model, where images for exceptional classes are not needed for training the model. In addition, the technique does not need manual intervention in defining each class or classifying image samples in each class. Further, the images may be acquired from any equipment, such as medical-images collected using magnetic resonance or X-ray based imaging, color images collected using RGB-camera or multi-spectral images collected using specialized equipment.

By way of introduction, one practical challenge faced in everyday clinical image analysis is to assess the quality of an image. The most common solution employed for this challenge is manual quality assessment performed by a technician controlling the acquisition equipment, i.e., a technician performing the scan. Although this solution may allow an early interruption of the image acquisition when errors are perceived in the first guiding images (i.e., localizer or scout images), it is dependent on the experience of the technician, and subtle errors may pass unnoticed. Such small errors may result in bigger errors downstream as the medical protocol progresses and may be perceived only in the final acquired images, leading to the whole scan being redone and a substantial increase in the exam time. Conceivably, an error may pass unnoticed throughout the workflow process, compromising the medical diagnostics based on the acquired medical images.

A different solution to this practical problem is to employ an automatic or semi-automatic quality assessment, using for instance a machine learning technique trained to classify into prior known error-classes, such as high levels of noise, missing organs, insufficient coverage, and so forth. To be properly implemented, such a machine learning algorithm needs data samples of every possible error-class it intends to classify, making the overall solution dependent on the error cases covered (i.e., learned) while training the machine learning algorithm. This limits the application of this solution in practical scenarios as it is normally very difficult to cover and get examples of all types of errors that might occur in a medical image.

The present techniques addresses certain of these issues and can be used in different scenarios that involve classification of images. As noted above, general classification approaches require knowledge of each class in the dataset and need a good balance of number of samples in each class. The present technique, in contrast, overcomes these limitations in general classification approaches. In particular, the present technique: (1) avoids the need of explicit knowledge of the class labels; (2) works with large class imbalances, which is common in medical image analysis; (3) provides an automated approach to decide if a new sample-image is similar to the training dataset; and (4) provides a distance metric from the training dataset for a new sample image, which can be used for multi-class classification. That is, the present technique provides an automatic method for the classification of images that does not rely on having image examples of all possible classes.

With the preceding introductory comments in mind, some generalized information is provided to provide both general context for aspect of the present disclosure and to facilitate understanding and explanation of certain of the technical concepts described herein. In particular, FIGS. 1-3 relate general background and explanatory material related to deep learning and neural networks and to certain examples of imaging systems (e.g., magnetic resonance imaging and X-ray transmission based imaging) that may be useful in understanding certain concepts discussed in greater detail below.

With this in mind, and as discussed herein, machine learning approaches may be used to classify images (e.g., medical images) without reference to a comprehensive set of images representative of each class. Machine learning and/or deep learning approaches discussed herein may be based on artificial neural networks, and may therefore encompass deep neural networks, fully connected networks, convolutional neural networks (CNNs), perceptrons, autoencoders, recurrent networks, wavelet filter banks, or other neural network architectures. These techniques are referred to herein as machine learning, though this terminology may also be used specifically in reference to the use of deep learning or deep neural networks, which is a neural network having a plurality of layers.

As discussed herein, deep learning techniques (which may also be known as deep machine learning, hierarchical learning, or deep structured learning) are a branch of machine learning techniques that employ mathematical representations of data and artificial neural networks for learning and processing such representations. By way of example, deep learning approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data.

In general, the processing from one representation space to the next-level representation space can be considered as one 'stage' of the process. Each stage of the process can be performed by separate neural networks or by different parts of one larger neural network. For example, as discussed herein, a single deep learning network or multiple networks in coordination with one another may be used to classify images (e.g., medical images) in a near real-time manner so as to provide useful feedback to a technician.

As part of the initial training of deep learning processes to solve a particular problem, training data sets may be employed that have known initial values (e.g., input images, projection data, emission data, magnetic resonance data, and so forth) and known or desired values or classifications for a final output of the deep learning process. The training of a single stage may have known input values corresponding to one representation space and known output values corresponding to a next-level representation space. In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

With the preceding in mind, FIG. 1 schematically depicts an example of an artificial neural network 50 that may be trained as a deep learning model as discussed herein. In this example, the network 50 is multi-layered, with a training input 52 and multiple layers including an input layer 54, hidden layers 58A, 58B, and so forth, and an output layer 60 and the training target 64 present in the network 50. Each layer, in this example, is composed of a plurality of "neurons" or nodes 56. The number of neurons 56 may be constant between layers or may vary from layer to layer. Neurons 56 at each layer generate respective outputs that serve as inputs to the neurons 56 of the next hierarchical layer. In practice, a weighted sum of the inputs with an added bias may be computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 60 (e.g., one or more image classifications as discussed herein) which, in conjunction with a target image 64, may be used to compute some loss or error function 62, which will be backpropagated to guide the network training.

The loss or error function 62 measures the difference or similarity between the network output and the training target. In certain implementations, the loss function may be a derived mean squared error (MSE). In others it could be the overlap ratio. Alternatively, the loss function 62 could be defined by other metrics associated with the particular task in question, such as a Dice (overlap measure) function or score. In addition, the loss function 62 could be a structure similarity index (SSIM) function to perceptually quantify the differences in network output and input.

To facilitate explanation of the present image classification technique using machine learning, the present disclosure primarily discusses these approaches in the context of an MRI system and an X-ray transmission based imaging system. However, it should be understood that the following discussion may also be applicable to other imaging modalities and systems as well as to non-medical contexts.

With this in mind, the embodiments described herein may be implemented as at least a part of or in conjunction with a magnetic resonance imaging (MRI) system, wherein specific imaging routines (e.g., diffusion MRI sequences) are initiated by a user (e.g., a radiologist or other technologist). The MRI system may perform data pre-acquisition (i.e., localizer imaging), primary data acquisition, data construction, and so forth. Accordingly, referring to FIG. 1, a magnetic resonance imaging system 100 is illustrated schematically as including a scanner 102, scanner control circuitry 104, and system control circuitry 106. According to the embodiments described herein, the MM system 100 is generally configured to perform MR imaging, such as imaging sequences for diffusion imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the MRI system 100 may include any suitable scanner or detector, in the illustrated embodiment, the system 100 includes a full body scanner 102 having a housing 120 through which a bore 122 is formed. A table 124 is moveable into the bore 122 to permit a patient 126 to be positioned therein for imaging selected anatomy within the patient.

Scanner 102 includes a series of associated coils for producing controlled magnetic fields for exciting the gyromagnetic material within the anatomy of the subject being imaged. Specifically, a primary magnet coil 128 is provided for generating a primary magnetic field, BO, which is generally aligned with the bore 122. A series of gradient coils 130, 132, and 134 permit controlled magnetic gradient fields to be generated for positional encoding of certain of the gyromagnetic nuclei within the patient 126 during examination sequences. A radio frequency (RF) coil 136 is configured to generate radio frequency pulses for exciting the certain gyromagnetic nuclei within the patient. In addition to the coils that may be local to the scanner 102, the system 100 also includes a set of receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain of the gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, Bo. A power input 44 (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuit 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuit 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuit 104 and system control circuit 106. In certain embodiments, the control and analysis circuit 160, while illustrated as a single unit, may include one or more hardware devices. The system control circuit 106 includes an interface circuit 166, which receives data from the scanner control circuit 104 and transmits data and commands back to the scanner control circuit 104. The control and analysis circuit 168 may include a CPU in a multi-purpose or application specific computer or workstation. Control and analysis circuit 168 is coupled to a memory circuit 170 to store programming code for operation of the Mill system 100 and to store the processed image data for later reconstruction, display and transmission. The programming code may execute one or more algorithms that, when executed by a processor, are configured to perform reconstruction of acquired data.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
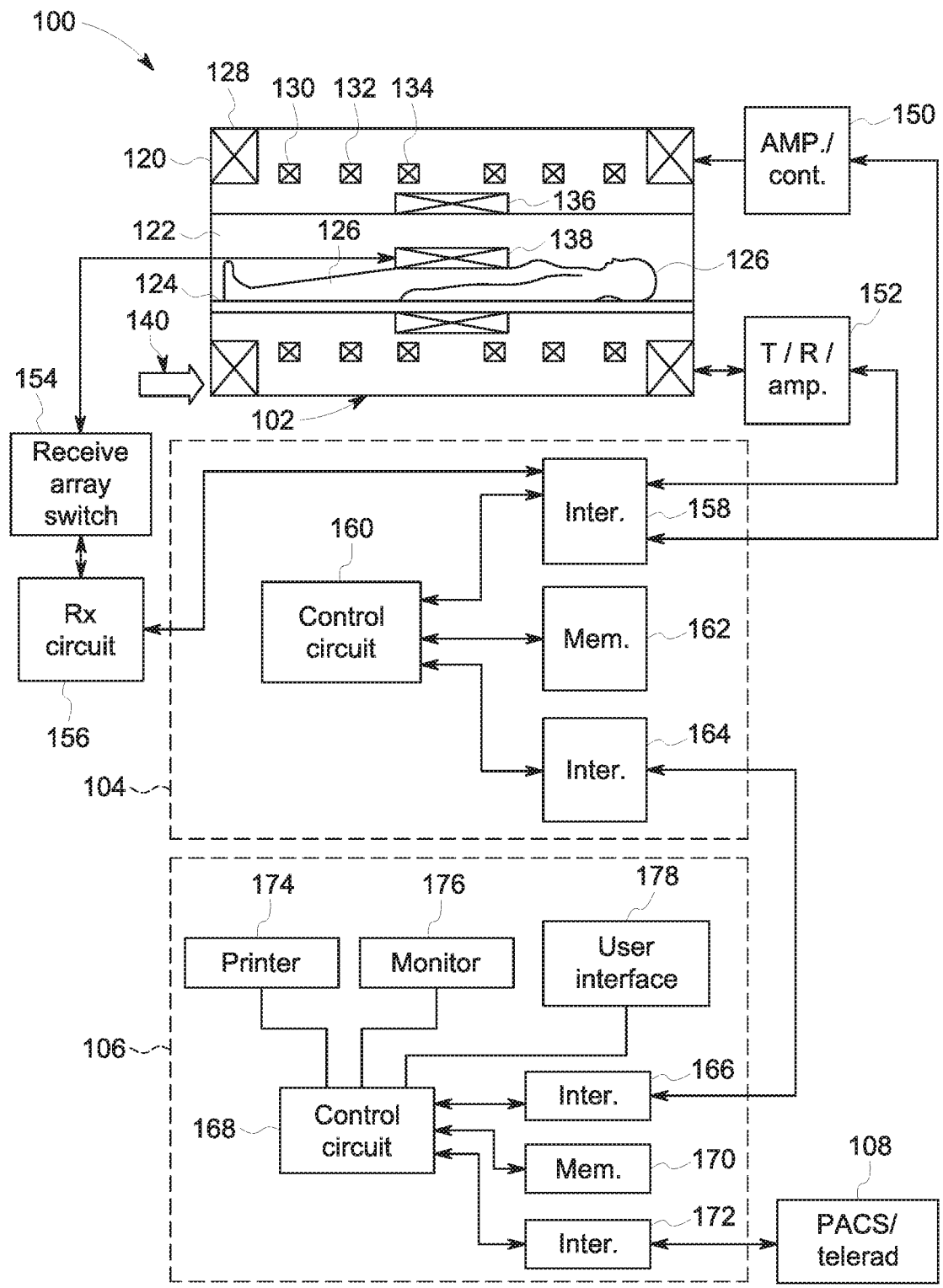
FIG. 2 illustrates an embodiment of a magnetic resonance imaging (MRI) system suitable for use with the disclosed technique.
Figure 3:
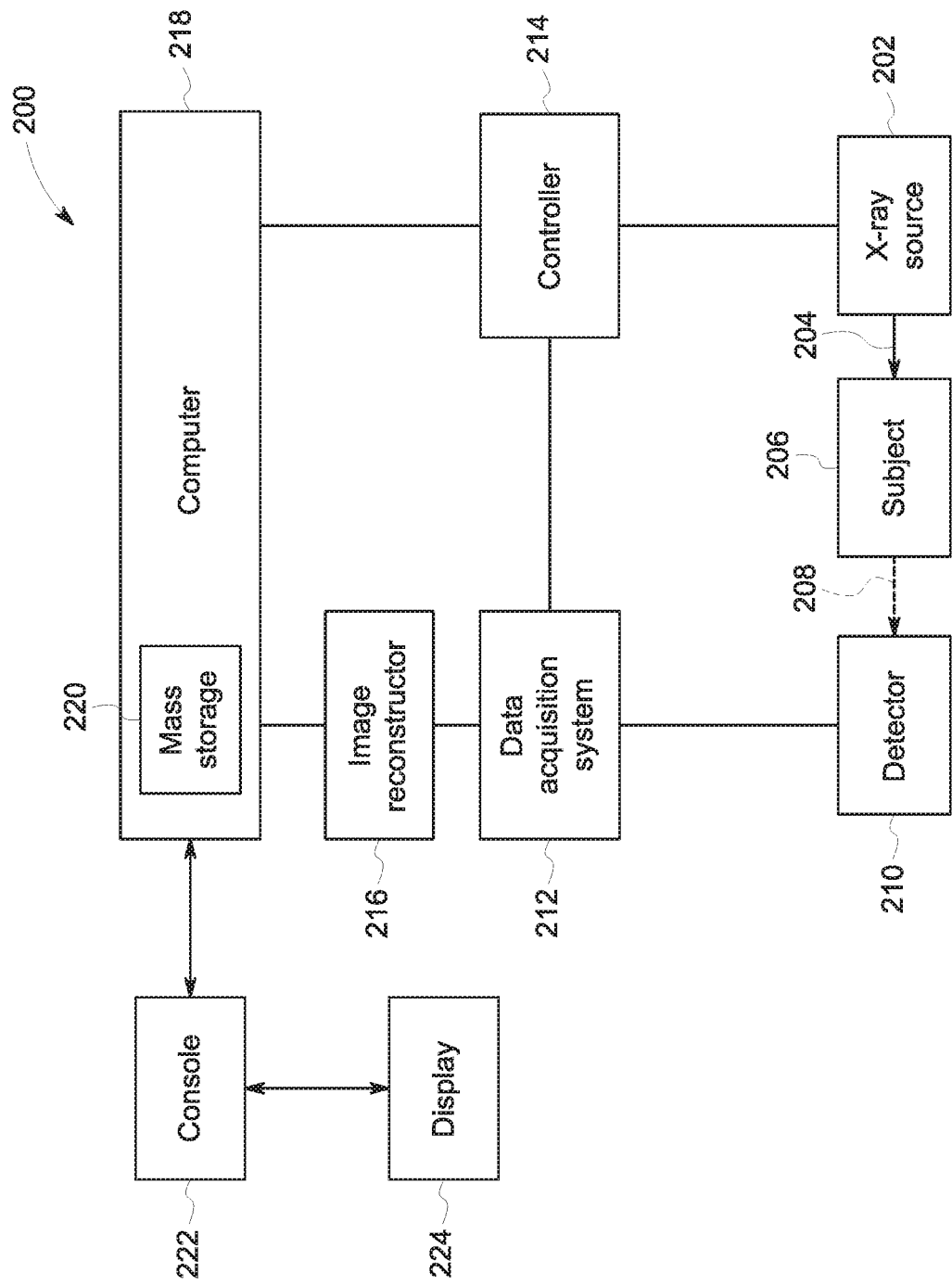
FIG. 3 is a block diagram of an X-ray imaging system, in accordance with aspects of the present disclosure.

While an MRI system 100 as shown in FIG. 2 may constitute a scan device used to generate images classified in accordance with the present technique, other imaging modalities may also be used to acquire images to be classified. For example, FIG. 3 depicts a generalized view of an X-ray transmission based imaging system 200 is shown as including an X-ray source 202 that projects a beam of X-rays 204 through a subject 206 (e.g., a patient or an item undergoing security or quality control inspection). It should be noted that while the imaging system 200 may be discussed in certain contexts, the X-ray imaging systems disclosed herein may be used in conjunction with any suitable type of imaging context or any other X-ray implementation. For example, the X-ray based system 200 may be part of a fluoroscopy system, a mammography system, an angiography system, a standard radiographic imaging system, a tomosynthesis or C-arm system, and/or a computed tomography (CT) system. Further, the X-ray based system 200 may be suitable for use not only in medical imaging contexts, but also in various inspection systems for industrial or manufacturing quality control, luggage and/or package inspection, and so on. Accordingly, the subject 206 may be a laboratory sample, (e.g., tissue from a biopsy), a patient, luggage, cargo, manufactured parts, nuclear fuel, or other material of interest.

The subject 206 may, for example, attenuate or refract the incident X rays 204 and produce the transmitted or projected X-ray radiation 208 that impacts a detector 210, which is coupled to a data acquisition system 212. It should be noted that the detector 210, while depicted as a single unit, may include one or more detecting units operating independently or in conjunction with one another. The detector 210 senses the transmitted X-rays 208 that pass through or off of the subject 206, and generates data representative of the radiation 208. The data acquisition system 212, depending on the nature of the data generated at the detector 210, converts the data to digital signals for subsequent processing. Depending on the application, each detector 210 produces an electrical signal that may represent the intensity and/or phase of each projected X-ray beam 208.

An X-ray controller 214 may govern the operation of the X-ray source 202 and/or the data acquisition system 212. The controller 214 may provide power and timing signals to the X-ray source 202 to control the flux of the X-ray radiation 204, and to control or coordinate with the operation of other system features, such as cooling systems for the X-ray source, image analysis hardware, and so on. An image reconstructor 216 (e.g., hardware and/or software configured for image reconstruction) may receive sampled and digitized X-ray data from the data acquisition system 212 and perform high-speed reconstruction to generate one or more images representative of different attenuation, differential refraction, or a combination thereof, of the subject 206. The images may be input to a processor-based computer 218 that stores the image in a mass storage device 220. As may be appreciated, the computer 218 may be utilized to implement aspects of the present image classification approach on reconstructed images.

The computer 218 also receives commands and scanning parameters from an operator via a console 222 that has some form of operator interface, such as a keyboard, mouse, voice activated controller, or any other suitable input apparatus. An associated display 224 allows the operator to observe images and/or image classifications and other data from the computer 218. The computer 218 uses the operator-supplied commands and parameters to provide control signals and information to the data acquisition system 212 and the X-ray controller 214.

With the preceding discussion of an example MRI system 100, X-ray based imaging system, and neural network 50 in mind, as discussed herein such tools may be used to classify images using machine learning approaches as discussed herein. For example, in one embodiment, image classification is performed using a deep autoencoder to generate statistics that may be used for the classification of images. Deep autoencoders are typically used for compression, image denoising, and/or dimensionality reduction. In contrast, in accordance with the present techniques, deep autoencoders are used for identity or regularity representation.

In accordance with one implementation of the present approach, only one group of images are used as training data samples, e.g. only images considered as good quality images or images from healthy subjects. This is significant because, in general, homogeneous samples from one group are abundant and easy to obtain, whereas samples from exceptional classes are normally discarded and difficult to obtain. That is, bad image data is typically discarded and, hence, unavailable for training purposes. To complicate matters further, there are many types of exceptionalities that may appear in medical images limiting the coverage of all types of possible exceptional cases by a general classification method.

With this in mind, the present technique has the technical advantage of applying an indirect binary or multiclass classification relying only on homogeneous image samples from one class, which are easier to obtain in a clinical environment. The availability of larger volumes of homogeneous samples also allows improvements to be made to the deep autoencoder more efficiently via continuous learning methods after its initial deployment in a clinical environment. In addition, the method employs a deep autoencoder for image classification, which is not a typical usage of a deep autoencoder.

In one implementation, the present image classification technique includes five processes or procedures, which are illustrated and discussed in greater detail with respect to FIGS. 4-8. The respective procedures have different objectives, with the last procedure being responsible for the final classification of an image and each one of the five procedures has prerequisites and steps that work in combination to carry out the present technique.

Figure 4:
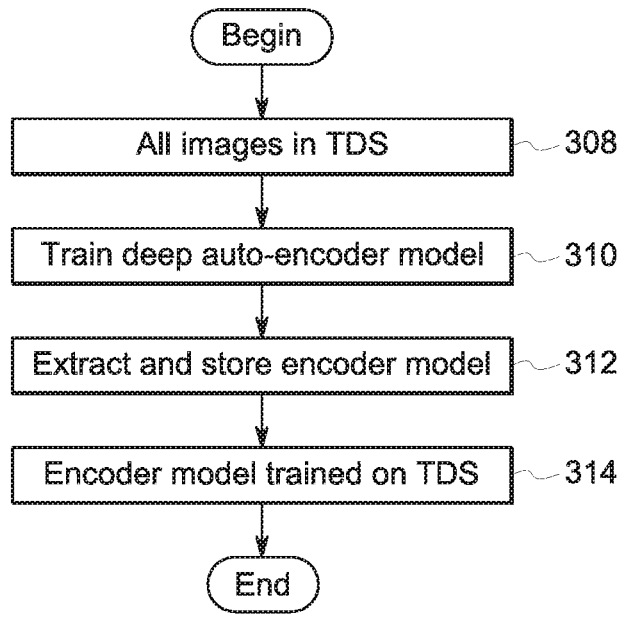
FIG. 4 depicts a process flow depicting steps in generating a trained encoder model, in accordance with aspects of the present disclosure.

With this in mind, the five procedures in the present image classification approach include:

(1) Given a training data set (TDS), train a deep autoencoder model (as discussed in greater detail below) and extract and store an encoder model from the trained full autoencoder model (FIG. 4).

Figure 5:
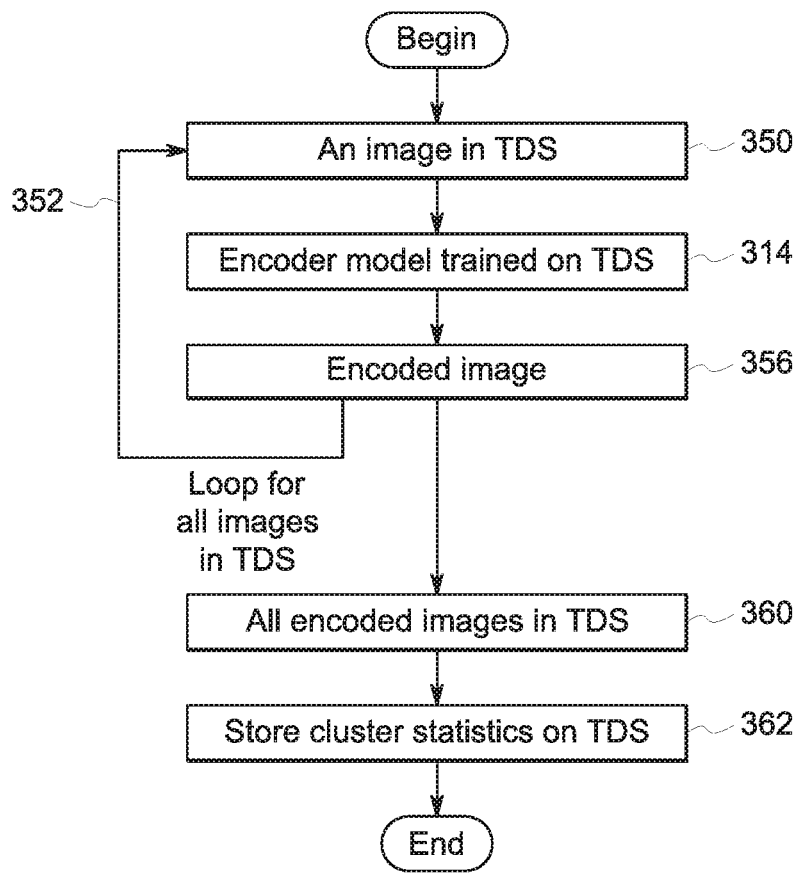
FIG. 5 depicts a process flow depicting steps in generating cluster statistics, in accordance with aspects of the present disclosure.

(2) Given the trained encoder model, encode all images in the training data set and compute and store cluster statistics characterizing about the images in the training data set (FIG. 5).

Figure 6:
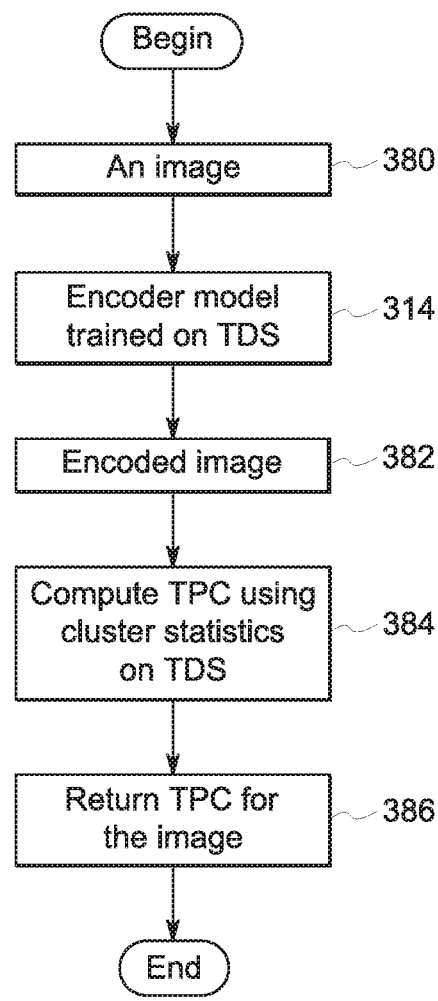
FIG. 6 depicts a process flow depicting steps in determining total pixel counts, in accordance with aspects of the present disclosure.

(3) Given the cluster statistics for training data set, define a procedure to compute and return the true-pixels count (TPC) of a given input image (FIG. 6).

Figure 7:
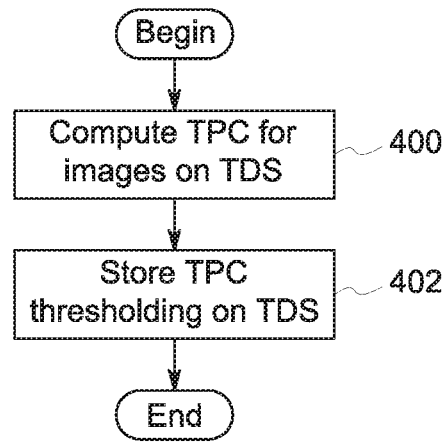
FIG. 7 depicts a process flow depicting steps for determining total pixel count thresholds, in accordance with aspects of the present disclosure.

(4) Given the true-pixels count procedure, compute and store a TPC threshold for the training data set (FIG. 7).

Figure 8:
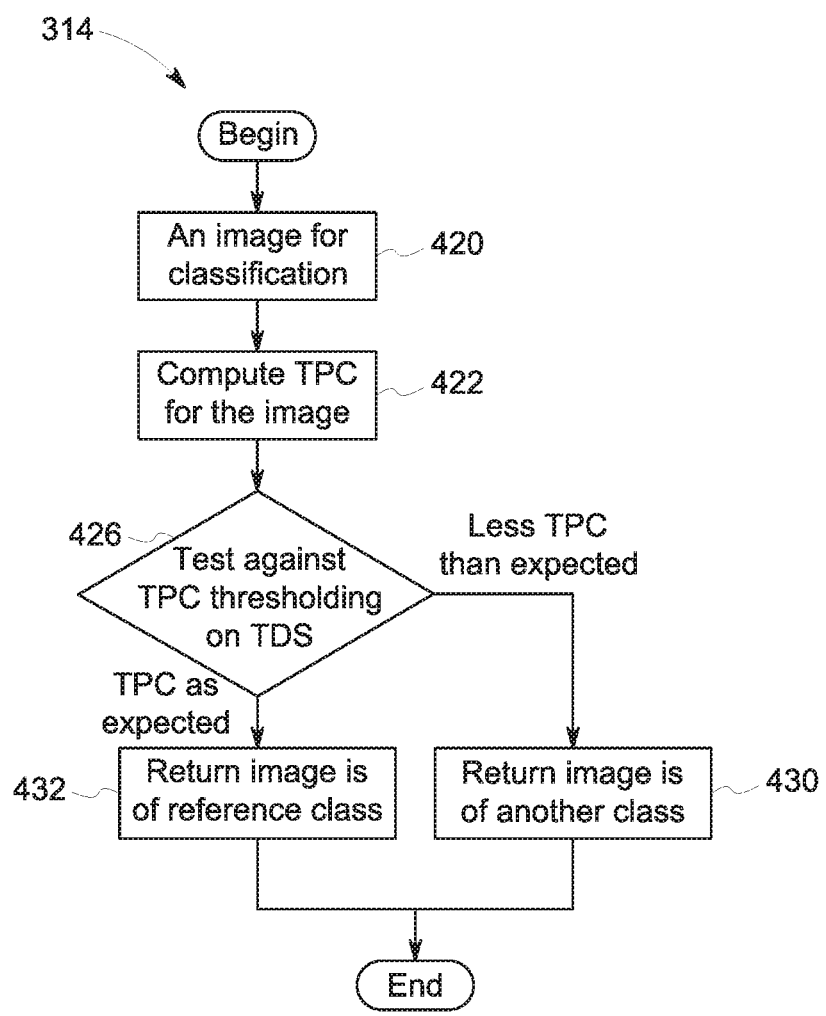
FIG. 8 depicts a process flow depicting steps for classifying images, in accordance with aspects of the present disclosure.

(5) Given the TPC threshold for the training data set, define a procedure to classify an input image in two or more classes, depending on choice of threshold values used (FIG. 8).

Turning to FIG. 4 to discuss the training procedure, a flow diagram is shown, that relates steps in training (step 310) a deep autoencoder model and extract and store (step 312) an encoder model 314 (shown in use in FIGS. 5 and 6). The autoencoder model is trained with a set of homogeneous images 308, or a reference group, referred to herein as the training data set (TDS).

Figure 9:
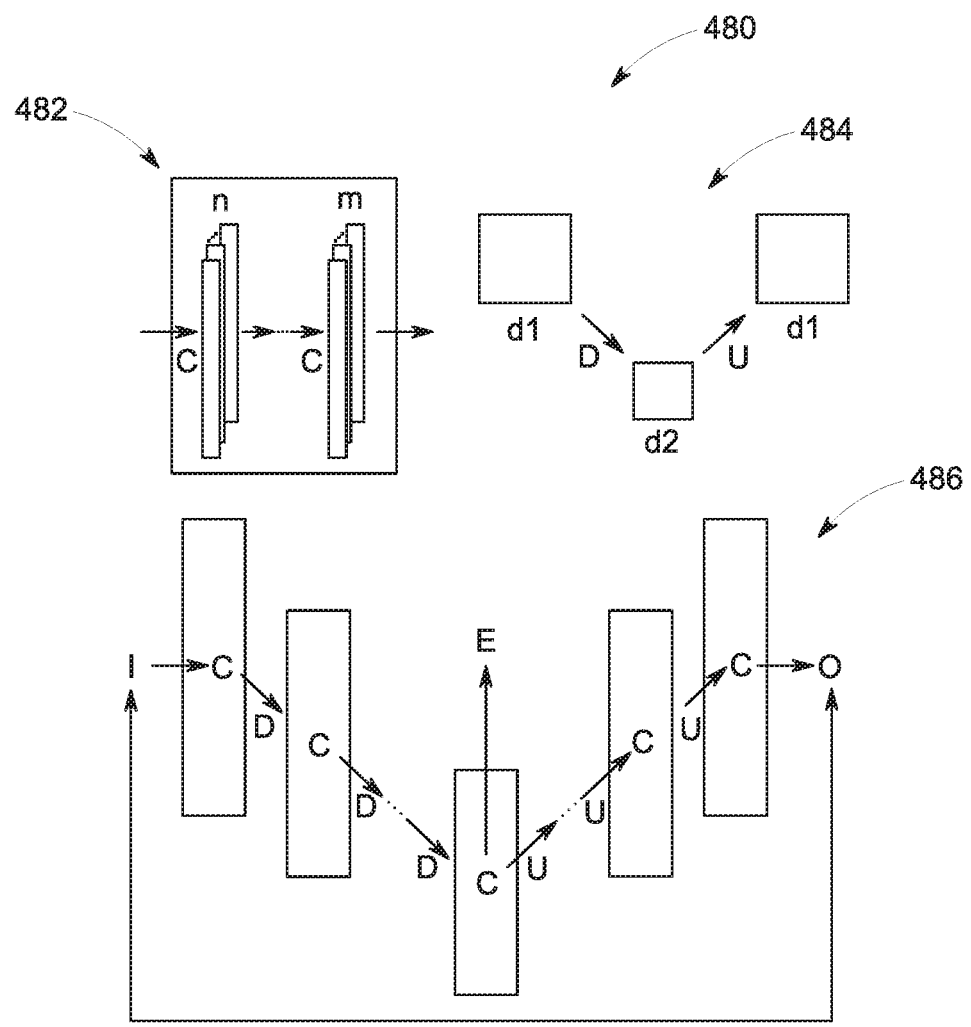
FIG. 9 is an illustrative drawing of both convolution passes and resizing passes and sequences combining these two in a deep autoencoder network architecture, in accordance with aspects of the present disclosure.

The deep autoencoder network model 480, illustrated in FIG. 9 has an underlying network architecture with one or more convolution layers where each convolution layer has a number of filters, n or m, and these layers are composed together in a convolution pass, C, corresponding to reference number 482. Each convolution pass 482 may have a different number of layers or filters, and it is followed by either a down-sampling pass, D, or an up-sampling pass, U, where either pass may be construed as a resizing pass 484 that reduces the input size from d1 to d2 dimensions or increase it from d2 to d1, respectively, in the architecture corresponding to reference number 486. The autoencoder model 480 uses all images in the training data set as both the input, I, and output, O, on its network architecture. In the depicted example, the architecture contains one or more sequences of convolution pass followed by down-sampling, until reaching the smallest output size from down-sampling, where the architecture starts to contain one or more sequences of convolution pass followed by up-sampling, until reaching the original input size of I in the final architecture output O. The exact number of layers, filters and sequences in the final architecture may be based on or determined by the specificities of the target images (i.e., the images to be processed).

After finishing the training of the autoencoder model 480, as illustrated in FIG. 4, the encoder model 314 is extracted and stored from the trained autoencoder model 480. In one implementation, the encoder model 314 corresponds to half of the entire autoencoder model 480. The input of the encoder model 314 is the same I of the autoencoder model 480, but its output (e.g., encoder output E), is one of the convolution-layer outputs, for instance the middle layer, in the last convolution pass from the sequence of convolutions followed by down-sampling in the architecture.

Turning to FIG. 5, a flow diagram illustrates the use of the trained encoder model 314 to encode images 350 present in the training data set to generate respective encoded images 356. In the depicted example, the individual images 350 may be process in an iterated loop 352, such as one image at a time, until all images are processed. An encoded image 356 in this context is a reduced or compacted version of the original input image 350.

After finishing the encoding of all images in training data set (illustrated in the aggregate as encoded image set 360), cluster statistics about the training data set are computed and stored (step 362), where a "cluster" is defined as a group of similar encoded images. In accordance with this technique, the cluster statistics may be used to define a regularity region in a per-pixel basis for the encoded images 360. Various cluster statistics may be used, depending on the specificities of the target images. One example of a cluster statistic in accordance with one implementation is to compute the $25^{th}$ and $75^{th}$ percentile values per pixel of all encoded images 160 in the training data set, where the region of regular encoded images would be the one falling in between the two percentile values. Another example of a suitable cluster statistic is to compute the mean ($\mu$) and the standard deviation ($\sigma$) per pixel of all encoded images 360 in the training data set, where the regularity region would be from $\mu-\sigma$ to $\mu+\sigma$.

Turning to FIG. 6, a flow diagram illustrates the use of the trained encoder model 314 to process a respective image to determine a true pixel count for the image. The depicted process flow corresponds to a reusable or repeatable flow for checking how much (i.e., the extent of overlap) of an input image 380 is within a regularity region as determined by the steps of FIG. 5. The depicted example illustrates that the input image 380 is processed using the encoder model 314 to generate an encoded image 382 based on the input image 380. Unlike the prior procedure, however, the process flow illustrated in FIG. 6 uses the previously determined cluster statistics to compute (step 384) a true-pixels count (TPC) that is a count of the pixels (i.e., "true pixels") in the encoded image 382 falling in the region defined by the cluster statistics derived based on the training data set. One example uses the 25th and $75^{th}$ percentile values per pixel as cluster statistics, where the true-pixels count is computed by counting the number of pixels falling between the two. In another example the mean ($\mu$) and standard deviation ($\sigma$) per pixel are used as cluster statistics, and the true-pixels count is computed by counting the number of pixels falling in the range [$\mu-\sigma$, $\mu+\sigma$]. As may be appreciated, the exact cluster statistics and range definition may depend on the characteristics of the target images. The last step in the depicted flow of FIG. 6 is to return (step 386) the true-pixels count (TPC) for the input image 380.

Turning to FIG. 7, a flow diagram illustrates steps in a process for setting a regularity threshold about the training data set (TDS) based on the true-pixels count of the training data set images. In the depicted example, the true-pixel counts (TPC) of the respective images in the training data set are computed (step 400), such as in accordance with the process described with respect to FIG. 6. Subsequently, a TPC threshold is computed and stored (step 402), where the TPC threshold is based on the true-pixels counts computed for the images in the training data set in the prior step.

The TPC thresholding is used, as discussed herein, to define a regularity region in a per-image basis. As with the cluster statistics, the TPC threshold may be computed and/or employed in different ways, depending on the imaging context and characteristics of the target images. In one example of TPC thresholding, the minimum true-pixels count is computed and used to define the region of regular encoded images as the ones that have at least this minimum count. Another example of TPC thresholding is to compute the mean ($\mu$) and the standard deviation ($\sigma$) of all true-pixels counts in the training data set, where the regularity region would be all encoded images with at least $\mu$ a true-pixels count. As with the procedures described with respect to FIGS. 4 and 5, the procedure described with respect to FIG. 7 is executed once for the entire training data set, and may be executed again if the training data set changes.

Turning to FIG. 8, a flow diagram illustrates steps for classifying an input image 420. The depicted process flow corresponds to a reusable or repeatable flow in which the true-pixel count (TPC) of the input image 420 is computed (step 422) using the process described with respect to FIG. 6. The computed true-pixels count of the input image is then compared (decision block 426) against the TPC threshold determined for the training data set (TDS), which is determined using the process outlined with respect to FIG. 7. As noted above, the TPC threshold value may be depending on the imaging context and/or the characteristics of the images in question. In the depicted example, if the true-pixels count for the input image 420 is less than the specified TPC threshold value, the process flow returns (step 430) that the input image 420 is of a different class than the reference group of images used to build the training data set. Otherwise, if the true-pixels count for the input image 420 meets or exceed the specified TPC threshold value, an indication is returned (step 432) that the input image 420 is a member of the reference class, i.e. the same class as the reference group in the training data set.

With the preceding process flows in mind, examples of implementations and assessment studies are described in greater detail below.

In a first study performed in the context of MM, the steps outlined in the process flows of FIGS. 4 through 8 were performed as outlined above. Each generic aspect of the described steps was instantiated for assessing the quality of magnetic resonance images of the brain, within the localizer protocol space. In this study the training data set (TDS) contains thousands of two-dimensional (2D) slice images with 128×128 resolution each, from different adult patients and orientations (either axial or coronal or sagittal), all of them considered good quality images of the brain.

With reference to FIG. 9, the deep autoencoder network architecture 480 employed two 2D convolutions with 3×3 kernel size in the convolution pass C, starting with n=32 filters each, down-sampling D was performed by 2D max-pooling, reducing each dimension in half, and each next convolution pass in the sequence also divided the number of filters by 2. Three sequences of convolution pass C and down-sampling D were used, reaching the lowest resolution of 16×16 in the encoded images. The middle convolution pass, that is the convolution pass from down-sampling D to up-sampling U, employed n=1 filter for each convolution layer and exposed the output of the second convolution layer as the encoder model 314 output E. Three sequences of convolution pass C and up-sampling U were also used to reach the output O. Both the number of filters and resolution were increased by doubling it, until they reached again n=32 filters and 128×128 resolution.

The autoencoder 480, and correspondingly the encoder model 314 were trained, as described with respect to FIG. 4, and cluster statistics for the training data set were generated and stored, as described with respect to FIG. 5. The cluster statistics were the mean ($\mu$) and standard deviation ($\sigma$) computed per pixel for all encoded 16×16 images in the training data set. Subsequently, the steps described with respect to FIG. 6 were performed to compute true pixel counts for the images of the training data set using the cluster statistics, such as by defining true pixels as being the pixels within the range of $[\mu-\sigma, \mu+\sigma]$, which may vary from 0 (no pixels in the range) to 255 (all pixels in the range).

With the preceding implementation steps in mind, the steps described with respect to FIGS. 7 and 8 were performed to assess the accuracy of the classification procedure in the study. For example as part of this assessment in the context of MM (FIG. 10) context, true-pixel counts (TPC) were computed (step 400) for three data sets: (A) the entire training data set, with only good quality images; (B) a testing data set, with different good quality images (i.e., good quality images not included in the training data set); and (C) a rejected data set, with only bad quality images.

Figure 10:
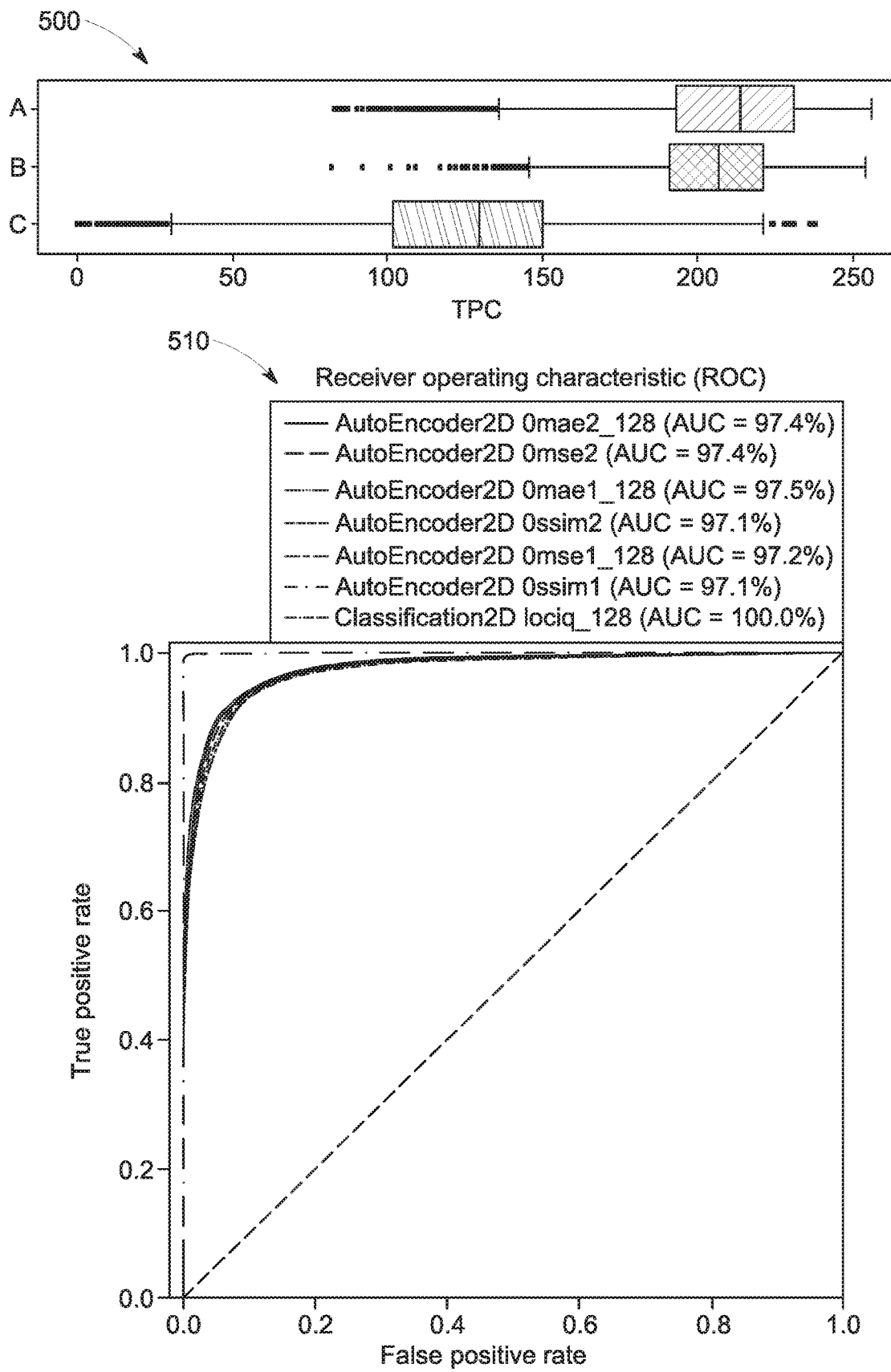
FIG. 10 depicts results from an MRI study in the form of true-pixel count distributions (top) and true and false positive rates curves (bottom), in accordance with aspects of the present disclosure.

For this study, the true-pixels count distributions are shown as distributions 500 of FIG. 10 (and distributions 520 for the mammography study discussed below). The statistical distribution of the true pixel counts for the three different groups reveals a similar distribution with high true pixel counts for the first two data sets having good quality images (i.e., data sets (A) and (B)) and a different distribution with lower true pixel counts for the third data set with bad quality images (i.e., data set (C)).

Varying the TPC threshold value to have all possible values, from 0 to 255, rather than stipulating one specific value at step 402, allowed a receiver operating characteristic (ROC) curve 510, 530 to be plotted by computing the true and false positive rates after executing the steps described with respect to FIG. 8 (i.e., the classification steps) for the testing and rejected data sets. In the MRI study, the ROC curve reveals an accuracy of 97% in differentiating between good or bad quality images.

Figure 11:
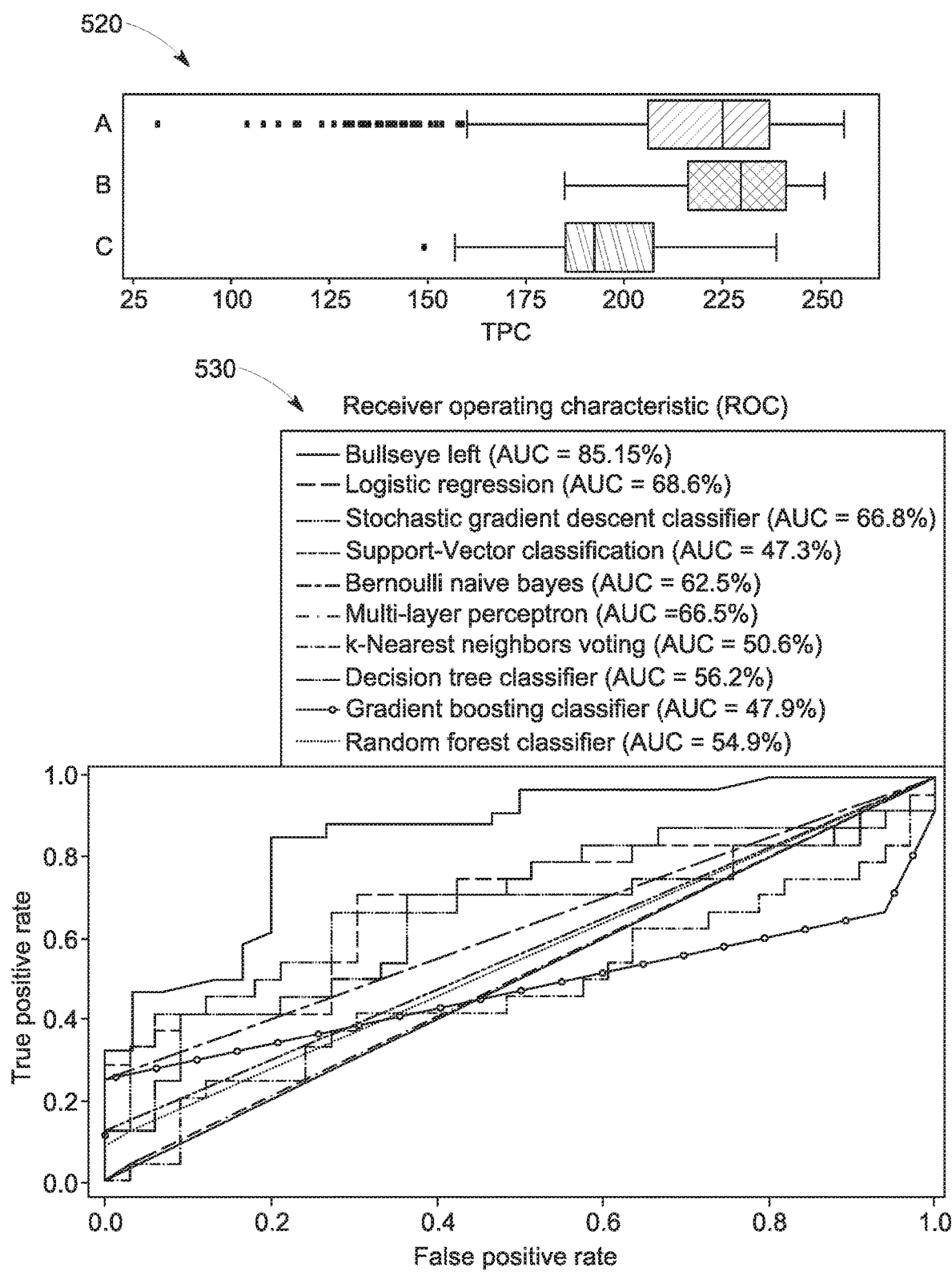
FIG. 11 depicts results from a mammography study in the form of true-pixel count distributions (top) and true and false positive rates curves (bottom), in accordance with aspects of the present disclosure.

The same methodology was performed to assess the accuracy of this classification approach for another medical imaging modality. In particular, FIG. 11 shows the results of applying the same classification and assessment methodology for mammography images. In this implementation, the 2D input images has a 256×256 resolution each, the network architecture had one additional down-sampling layer and one additional up-sampling layer, and there was an abundance of good quality images in the training dataset (TDS) of 100 to 1 in comparison with bad quality images. Other aspects were consistent with the MRI study outline above. Of the nine conventional classification algorithms tested, all of them performed poorly due to the severe class imbalance. In contrast, the method of present disclosure, named "Bullseye left" in the legend of FIG. 11, presents 85% in differentiating between good or bad quality images accuracy in the area under the ROC curve 530.

With the preceding discussion and study results in mind, certain variations and modifications of the present technique are described that may be useful in various contexts.

In a first variation, one or more techniques may be employed to improve the training of the deep autoencoder model 480 in the context of the steps outlined with respect to FIG. 4. For instance, in one embodiment the training data set (TDS) may be split into separate training and validation sets to allow the accuracy of the technique to be checked during training using the validation set. Similarly cross validation may be performed, where training is run through several times with the portion of the images split apart to form the validation set being varied in each run. The best model trained from the different runs may then be employed.

In a further variation, multiple dimensions of the medical images may be considered, as opposed to just two dimensions, or 2D images. For example, a magnetic resonance imaging system typically acquires medical images in volumes, i.e., 3D images. Such 3D images may instead be used as the input and output images for training, as well as for the steps related to true-pixel count and the quality assessment. Similarly, another multi-dimensional medical image may be a volume with motion, i.e., a 4D image, that is employed for moving organs such as the heart. Regardless of the number of dimensions in the input and output medical images, d1 and d2 as used herein are tuples of any number of dimensions as appropriate for the context established by the medical images being classified and/or assessed.

In another variation, more than one class of images may be used, instead of only one reference class, to compute cluster statistics as described with respect to the process flow steps of FIG. 5, and to compute TPC thresholds as described with respect to the process flow steps of FIG. 7. The use of multiple classes of images may improve the definition of the per-pixel and per-image regularity regions in the procedures of FIGS. 5 and 7 respectively. This variation may improve the overall classification accuracy by knowing the distribution of the encoded image pixels and the true-pixels count for not only the reference group class but also for other classes of images. In such a variation, the procedure for training the deep autoencoder model 480, as described with respect to FIG. 4, may continue to use only the reference group of images.

In a further variation, the number of classes (and therefore, classifications) may be increased, therefore allowing classification into more than two classes. Such multi-class approaches may help account for different distances from the reference group of images, i.e., different degrees of difference that may themselves correspond to different categories or types of images or errors. In this variation, the true-pixel count falls into three or more ranges of values (i.e., there are multiple TPC thresholds as opposed to a single threshold), instead of two ranges (i.e., one for the reference group and another for a non-reference class of images). In this variation, decision block 426 of FIG. 8 is modified so as to consider multiple threshold values, thereby delimiting different ranges of distances to be returned as classes. Each class represents a distance from the reference group, from close ones in high true-pixels count ranges to distant ones in small true-pixels count ranges.

One scenario for using multiple classes may involve providing an acceptance parameter for end users to adjust, allowing different clinical sites to define what will be considered an acceptable image. In this scenario, the same trained encoder model 314 may be deployed to all sites, that is to say processes described with respect to FIGS. 4-7 remain the same.

Another scenario involves the classification of tumors from medical images. As tumors are rare and their severity varies, there are limited image examples of these rare sub-classes. In contrast, there are many examples of healthy subjects in most clinical datasets. The presently disclosed technique can be applied in this scenario to measure the distance of a patient test image from the healthy reference group, which can then be used to classify into different tumors sub-types, with the greater distance from the healthy reference group likely corresponding to increasing severity.

In an additional variation, variance may be added to the acquired images by changing one or more of their characteristics. One example is to increase or decrease the amount of noise present in the pixel values, or multiply to add intensity bias, altering the original images without changing their status (i.e., if an image is considered to be in the reference group, the altered image will also be considered in the reference group). Another example is to shift or rotate the image pixels, effectively changing the overall location of the organ or structure present in the image. By changing images in this manner, artificial or synthesized images may be generated that can be added to the set of acquired images and increasing the number of images available. The additional images can be used in any of the disclosed procedures to increase the overall efficacy of the technique.

As may be appreciated, the presently disclosed processes may be realized in hardware, software, or a combination of hardware and software, such as may be present or implemented in an imaging system as described herein, or a computing system in direct or indirect communication with such an imaging system. Further, the presently disclosed processed may be realized in a centralized fashion in one computer system or in a distributed fashion where different elements are spread across several interconnected computer systems. Any kind of computer system or other apparatus adapted for carrying out the techniques described herein is suitable. A typical combination of hardware and software may be a general or special purpose computer system with a computer program that, when being loaded and executed, controls the computer system such that it carries out the processes described herein.

Suitable computer systems may include one or more procedures to train a deep autoencoder model and compute statistics over a training data set using an encoder model, storing all information in a computer-readable medium. The present techniques allow a computer system to execute these procedures and compute a true-pixels count using the stored trained model and statistics. It also allows replacing or combining the described method with a number of variations, to improve its efficiency or efficacy in different directions.

With respect to practical applications and effects of the present techniques, one of the practical applications can be to ensure that the quality of acquired images is good for clinical diagnosis with medical images. In particular, with increasing patient burden, it may be desirable to have an automated solution to separate medical images in either acceptable or unacceptable quality and a machine learning technique as described herein can be used for such classification. However, as noted above, in most medical datasets, there is extreme shortage of images with unacceptable quality and abundance of images with acceptable quality, making it extremely challenging to train a traditional classifier due to substantial class imbalance. As described herein, the present methodology based on a deep learning autoencoder model overcomes the challenge of class imbalance. Instead, the disclosed methodology may utilize images determined to have acceptable quality for training and can be used for automated binary classification or multi-class classification of new patient images into classes of acceptable or unacceptable quality.

With respect to commercial advantages, the present methodology provides certain benefits, including speeding up examinations and improving efficacy by classifying medical images automatically. The use of an automated image classifier to, for instance, classify images as acceptable or unacceptable quality allows the medical equipment to be used more often, reducing retakes and revisits, and this also frees up technicians' valuable time for other tasks. During a medical protocol several images may be acquired in different stages of the workflow, and each one of them may be classified as acceptable or unacceptable by the methodology of the present disclosure, allowing for an improved efficacy of the overall medical protocol. In other words, the methodology may be used for a fast accept-or-reject criterion in an early stage of the workflow pipeline, as well as further down the pipeline to do the quality assessment on final high-resolution images, that will be used for medical diagnosis.

A further commercial advantage is to reduce cost in collecting, storing and labeling image samples within exceptional groups of images. General classification techniques require prior knowledge of classes and a balanced number of examples for each of those classes to work properly. This requirement generally translates to additional effort to collect exceptional images, which are not easily available, increasing the cost of development of such techniques. The proposed technique eliminates such development expense as it only uses one homogeneous group of images of interest, which are abundant and readily available.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of using a machine learning image classification algorithm, comprising:

receiving a trained autoencoder model trained on a training data set, wherein the training data set includes training images classified as being of a first class, wherein the trained autoencoder model comprises one or more convolution layers, each convolution layer comprising a plurality of filters, wherein subsets of convolution layers are organized as comprising convolution passes, wherein each convolution pass is followed by one of an up-sampling pass or a down-sampling pass;

deriving an encoder model from the trained autoencoder model;

using the encoder model to classify input images, wherein each respective input image is classified as being either of the first class or one or more other classes; and outputting a classification for one or more of the input images.

2. The method of claim 1, wherein the training images classified as being of the first class correspond to previously acquired images determined to be of acceptable diagnostic quality.

3. The method of claim 1, wherein the one or more other classes comprise classes determined to be of unacceptable diagnostic quality.

4. The method of claim 1, wherein the encoder model comprises half of the trained autoencoder model.

5. The method of claim 1, wherein each respective input image is classified based on a degree of distance from the training images of the training data set as determined by true pixels counts.

6. The method of claim 1, wherein one or both of the training images and reference images are one of two-dimensional images, three-dimensional volume images, or four-dimensional time-varying volume images.

7. The method of claim 1, wherein one or both of the training images and input images comprise images acquired using a magnetic resonance imaging (MRI) system.

8. The method of claim 1, further comprising:
using the encoder model to encode training images of the training data set;
determining a cluster statistic for the training data set based on the encoded training images;
determining true-pixels counts (TPC) for the training images of the training data set using the cluster statistic;
determining one or more TPC thresholds based on the determined TPC for the training images of the training data set; and
comparing a TPC of a respective input image to the one or more TPC thresholds to classify the respective input image as being either of the first class or the one or more other classes.

9. The method of claim 8, further comprising:
using one or more additional classes of images to determine one or both of the cluster statistics or the TPC threshold.

10. The method of claim 1, wherein an output of the encoder model is a convolution layer output.

11. The method of claim 10, wherein the convolution layer output is from a last convolution pass from a sequence of convolutions followed by down-sampling in the trained autoencoder model.

12. A method for classifying images, comprising:
encoding training images of a training data set using an encoder model, wherein the encoder model comprises a subset of a trained autoencoder model;
determining a cluster statistic for the training data set based on the encoded training images;

determining true-pixels counts (TPC) for the training images of the training data set using the cluster statistic;
determining one or more TPC thresholds based on the determined TPC for the training images of the training data set;
comparing a TPC of a respective input image to the one or more TPC thresholds;
based on the comparison to the TPC of the respective input image to the one or more TPC thresholds, classifying the respective input image, wherein each respective input image is classified as being either of a first class used to train the autoencoder model or one or more other classes; and
outputting a classification of the respective input image.

13. The method of claim 12, further comprising:
using two or more classes of images to determine one or both of the cluster statistics or the TPC threshold.

14. The method of claim 12, wherein the autoencoder model comprises:
one or more convolution layers, each convolution layer comprising a plurality of filters, wherein subsets of convolution layers are organized as comprising convolution passes, wherein each convolution pass is followed by one of an up-sampling pass or a down-sampling pass.

15. The method of claim 12, wherein the encoder model comprises half of the autoencoder model.

16. The method of claim 12, wherein one or both of the training images and input images are one of two-dimensional images, three-dimensional volume images, or four-dimensional time-varying volume images.

17. The method of claim 12, wherein act of classifying the respective input image takes into account an acceptance parameter defined for the clinical site where the respective input image is acquired.

18. The method of claim 12, wherein the respective input image is a tumor image, wherein the first class comprises images of healthy tissue, and wherein the classification of the tumor image corresponds to one or both of a tumor sub-type or tumor severity.

19. An image classification system, comprising:
processing circuitry configured to execute one or more stored routines, wherein the routines, when executed, cause the processing circuitry to:
encode training images of a training data set using an encoder model, wherein the encoder model comprises a subset of a trained autoencoder model;
determine a cluster statistic for the training data set based on the encoded training images;
determine true-pixels counts (TPC) for the training images of the training data set using the cluster statistic;
determine one or more TPC thresholds based on the determined TPC for the training images of the training data set;
compare a TPC of a respective input image to the one or more TPC thresholds;
based on the comparison to the TPC of the respective input image to the one or more TPC thresholds, classify the respective input image, wherein each respective input image is classified as being either of a first class used to train the autoencoder model or one or more other classes; and
output a classification of the respective input image.

20. The image classification system of claim 19, wherein the routines, when executed, further cause the processing circuitry to:

use two or more classes of images to determine one or both of the cluster statistics or the TPC threshold.

21. The image classification system of claim 19, wherein the autoencoder model comprises:
one or more convolution layers, each convolution layer comprising a plurality of filters, wherein subsets of convolution layers are organized as comprising convolution passes, wherein each convolution pass is followed by one of an up-sampling pass or a down-sampling pass.

22. The image classification system of claim 19, wherein the encoder model comprises half of the autoencoder model.

* * * * *